(12) United States Patent
Handa et al.

(10) Patent No.: US 6,935,982 B2
(45) Date of Patent: Aug. 30, 2005

(54) DIFFERENTIAL GEAR

(75) Inventors: Akio Handa, Saitama (JP); Bunzo Seki, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 210 days.

(21) Appl. No.: 10/345,151

(22) Filed: Jan. 16, 2003

(65) Prior Publication Data

US 2004/0248691 A1 Dec. 9, 2004

(30) Foreign Application Priority Data

Jan. 21, 2002 (JP) ........................ 2002-012009

(51) Int. Cl.$^7$ .......................... F16H 48/06; F16H 48/20
(52) U.S. Cl. .................. 475/231; 475/234; 475/237
(58) Field of Search ................. 475/231, 234, 475/237, 243

(56) References Cited

U.S. PATENT DOCUMENTS

| | | | | | |
|---|---|---|---|---|---|
| 964,387 | A | * | 7/1910 | Burnam | 475/237 |
| 1,723,901 | A | * | 8/1929 | Todd | 475/237 |
| 2,152,771 | A | * | 4/1939 | Ormsby | 475/206 |
| 2,803,150 | A | * | 8/1957 | Fisher | 475/150 |
| 4,043,224 | A | * | 8/1977 | Quick | 475/237 |
| 4,420,059 | A | * | 12/1983 | Suzuki | 180/248 |
| 6,199,380 | B1 | * | 3/2001 | Ishii | 60/485 |
| 6,324,842 | B1 | * | 12/2001 | Ishii | 60/454 |
| 6,432,020 | B1 | * | 8/2002 | Rivera et al. | 475/231 |

FOREIGN PATENT DOCUMENTS

| | | | | | |
|---|---|---|---|---|---|
| JP | | 63235748 A | * | 9/1988 | ............. F16H/1/44 |
| JP | | 11278073 A | * | 10/1999 | ........... B60K/17/16 |
| JP | | 2001-071773 A | | 3/2001 | |

\* cited by examiner

*Primary Examiner*—Tisha Lewis
(74) *Attorney, Agent, or Firm*—Birch, Stewart, Kolasch & Birch, LLP

(57) ABSTRACT

A recess is formed on the side surface of output-side cams on the right side with through holes being formed on the sidewall of the case body of the differential case at positions corresponding to the recesses. An annular member is placed on the case body so as to be capable of moving, and projections are provided on the annular member so that they can be inserted into and pulled out of the recess via the through hole. The differential case and the right side output cam are rigidly joined by inserting the projection into the recess on the right side output cam through the through hole and thus the input-side block is not operated. Therefore, a power force is not transmitted to the left side output cam, and thus the differential function of the left and right drive wheels can be suspended.

18 Claims, 11 Drawing Sheets

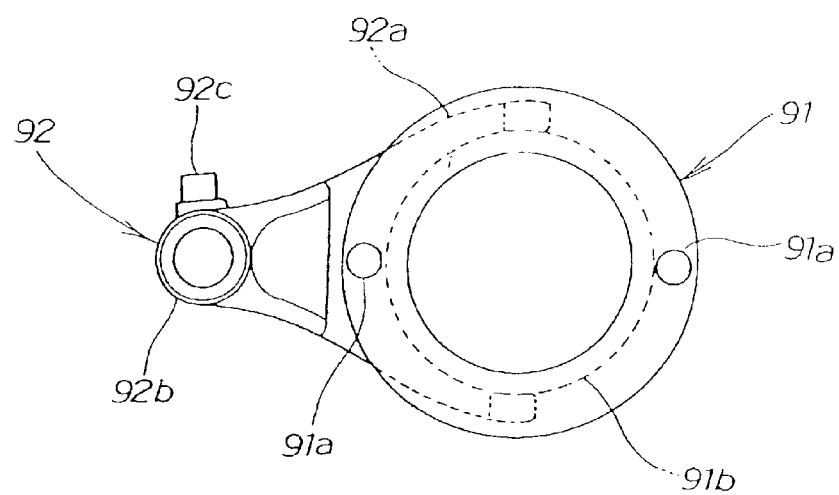
FIG. 7
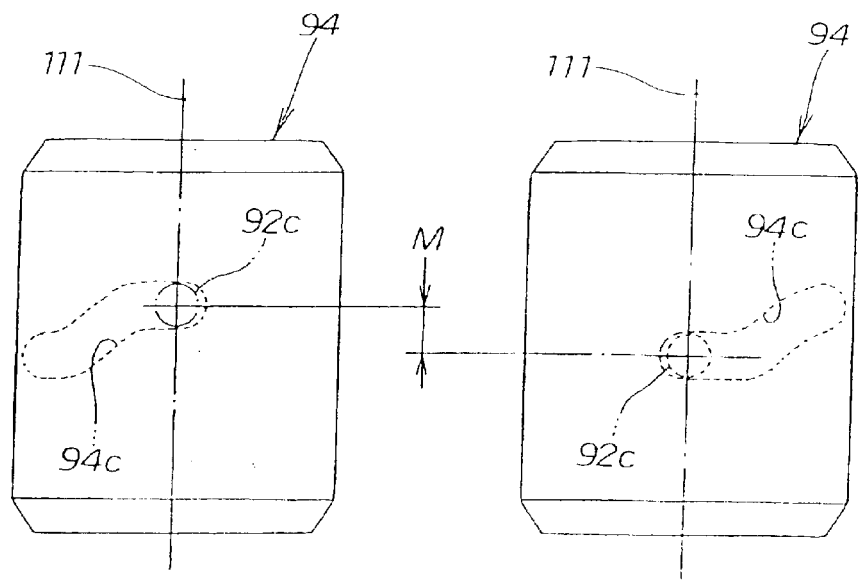
FIG. 8(a)  FIG. 8(b)

DIFFERENTIAL GEAR

CROSS-REFERENCE TO RELATED APPLICATIONS

The present nonprovisional application claims priority under 35 USC 119 to Japanese Patent Application No. 2002-012009 filed on Jan. 21, 2002 the entire contents thereof is hereby incorporated by reference.

BACKGROUND OF THE INVENTION

1. Field of the Invention

The present invention relates to a differential gear combined with a differential lock mechanism.

2. Description of Background Art

For example, in the two-wheel drive vehicle, since the radii of turn for the respective right and left drive wheels are different, a differential gear for distributing drive torque to the respective wheels while absorbing a difference in the revolution of these wheels, or generating revolutions suitable for the respective wheels is required when the vehicle turns.

Though this differential gear absorbs the difference of revolution, when one of the left and right drive wheels slips on a road surface of low frictional coefficient, a drive force of the other one of those wheels is reduced, and hence the total drive force is lowered. Therefore, especially in the case of four-wheel drive vehicles or special vehicles for rough terrain drive is provided with Limited-Slip Differentials for limiting the differential of motion between the respective wheels to secure a driving force between the left and right drive wheels.

A final reduction gear provided with such a Limited-Slip Differential in the related art will be described below (See, also JP-A-071773/2001).

FIG. 12 is a cross-sectional view of a final reduction gear in the related art. The final reduction gear 200 includes a differential case 204 constructed by coupling a drive pinion 202 to the engine via a joint 201, meshing a ring gear 203 with the drive pinion 202, and mounting a cap 203a on the ring gear 203. This device allows for the input-side blocks 205, 206 to engage the inner peripheral surface of the differential case 204, clamping these input-side blocks 205, 206 between two output-side cams 207, 208, coupling the drive shafts 211, 212 to the output-side cams 207, 208 respectively, and connecting the wheels with the drive shafts 211, 212. A housing 214, 215 is illustrated in FIG. 12.

The differential case 204, the input-side blocks 205, 206 stored in the differential case 204, and the output-side cams 207, 208 described above are main elements that constitute a Limited-Slip Differential 220 adapted to generate friction torque for limiting differential.

Power is transmitted in the following order of engine→the joint 201→the drive pinion 202→the ring gear 203→the differential case 204→the input-side blocks 205, 206→the output-side cams 207, 208→the drive shafts 211, 212→the wheels.

The frictional force generated when slippage occurs independently at the input-side blocks 205, 206, the output-side cam 207, the input-side blocks 205, 206, and the output-side block 208, limits the differential of motion between the left and right wheels.

In the final reduction gear 200 described above, for example, when the left and right wheels drive on road surfaces that are different in frictional coefficient respectively, the Limited-Slip Differential 220 ensures a drive force of the wheel driving on the road surface having higher frictional coefficient. However, especially on a slippery muddy ground surface and the like, a driving force may be transmitted to neither of wheels. Therefore, employment of a function to disable differential between both wheels, or a so-called differential lock, is desired. However, significant modification of the construction of the final reduction gear 200 in the related art results in a significant increase in costs.

SUMMARY AND OBJECTS OF THE INVENTION

Accordingly, it is an object of the present invention to provide a differential gear combined with a differential lock mechanism while minimizing an increase in costs.

In order to achieve the object described above, the present invention is directed to a differential gear including a ring gear meshed with a drive pinion to be connected to an engine, a case mounted on the ring gear, a plurality of input-side blocks partially fitted into grooves formed on the inner surface of the case, and two output-side cams being capable of clamping the blocks with the inner surfaces of the case so as to allow relative slippage and rotation independently due to the frictional force with each block, and being connected to the left and right drive wheels respectively. The outer surface of the output-side cam is formed with a recess and the case is formed with a through hole on the sidewall at a position corresponding to the recess. An annular member is placed on the case so as to be capable of moving, and a projection is formed on the annular member so as to be capable of being inserted in and pulled out from the recess through the through hole.

By inserting the projection into the recess of the output-side cam thorough the through hole, the case and the output-side cam may be rigidly joined and hence the differential function of the left and right drive wheels may be suspended. Since this operation is achieved simply by forming the recess on the output-side cam, forming the through hole on the case, and placing the movable annular member on the case, the basic construction of the differential gear in the related art is not modified greatly. Thus, the construction is simplified and thus a significant increase in costs may be alleviated.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 7 is a side view of an annular member and a fork member of the differential lock mechanism according to the present invention;

FIGS. 8(a) and 8(b) are side views of a cam member in the differential lock mechanism according to the present invention;

DETAILED DESCRIPTION OF THE PREFERRED EMBODIMENTS

Figure 1:
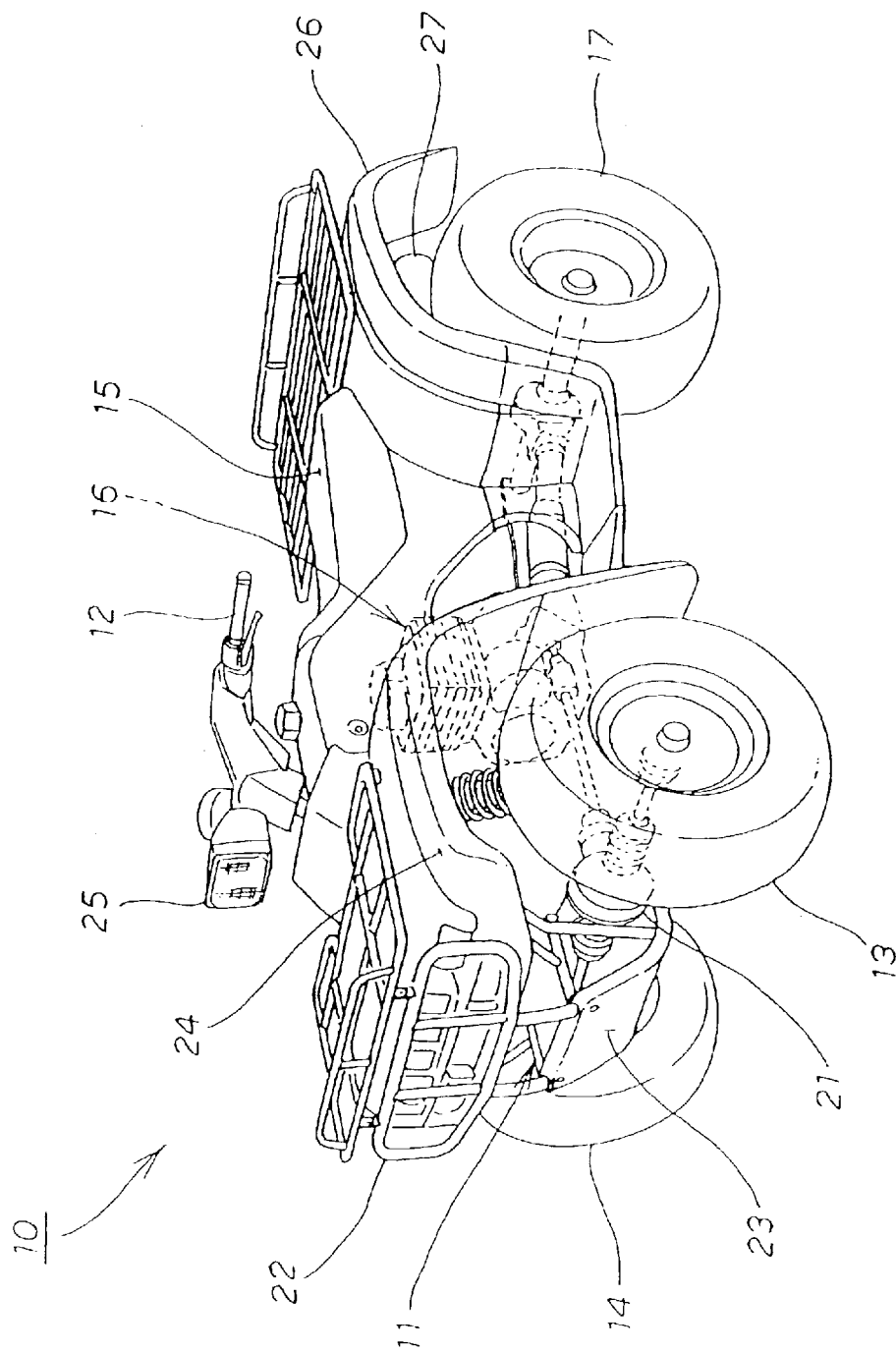
FIG. 1 is a perspective view of a vehicle having a differential gear according to the present invention built in the final reduction gear.

Referring now to the attached drawings, an embodiment of the present invention will be described. The drawings are to be viewed so that the reference numerals are seen in the right way.

FIG. 1 is a perspective view of a vehicle having a differential gear according to the present invention built into a final reduction gear. A vehicle 10 is of the type suitable for traveling on rough-terrain, and includes a handle 12 rotatably mounted on a vehicle body frame 11, front wheels 13, 14 connected to the handle 12 via a steering unit, not shown, so as to be steerable and mounted on a vehicle body frame 11 via arms, not shown, so as to be capable of vertical movement. A seat 15 is mounted on the vehicle body frame 11. A power unit 16 is provided that includes an engine and a transmission disposed under the seat 15. Rear wheels 17, 18 (rear wheel 18 is not shown in the figure) are to be driven together with the front wheels 13, 14 by the power unit via a power transmission mechanism that will be described later.

A front final assembly 21 as a final reduction gear is illustrated in FIG. 1. The front final assembly is one of the components of the power transmission mechanism and includes a differential gear of the present invention, which will be described later, integrated therein, and is interposed between the left and right front wheels 13, 14. A front bumper 22, an under cover 23, a front fender 24, a head lamp 25, a rear fender 26, and a muffler 27 are provided as part of the vehicle.

Figure 2:
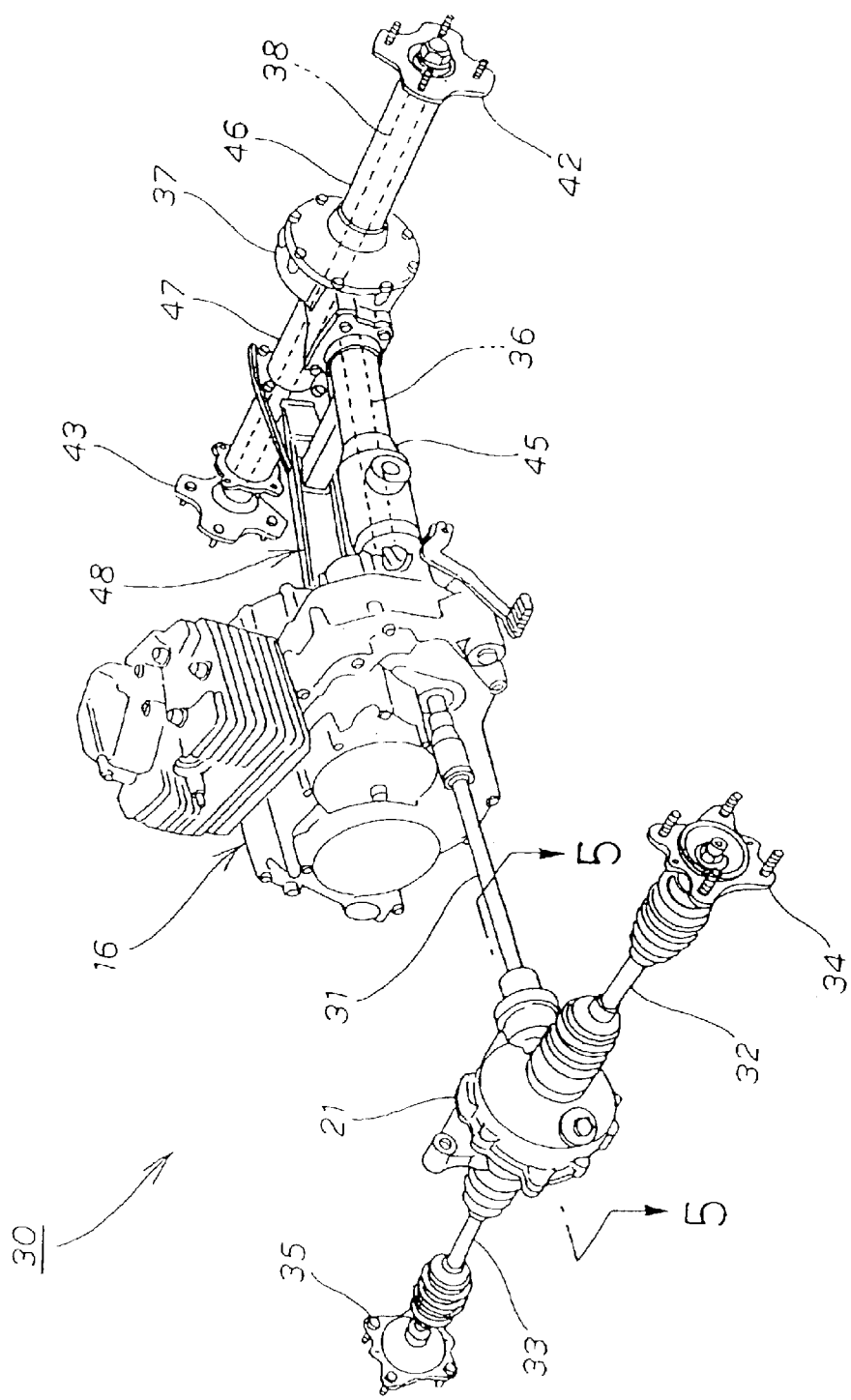
FIG. 2 is a perspective view showing a power transmission mechanism of a vehicle having a differential gear according to the present invention built therein.

FIG. 2 is a perspective view showing a power transmission mechanism of the vehicle having the differential gear according to the present invention integrated therein. The power transmission mechanism 30 includes a front propeller shaft 31 extending from the lower portion of the power unit 16 toward the front. A front final assembly 21 is connected to the front end of the front propeller shaft 31. Front drive shafts 32, 33 are connected to the left and right sides of the front final assembly 21. Hubs 34, 35 are connected to the respective ends of the front drive shafts 32, 33 with a rear propeller shaft 36 extending from the lower portion of the power unit 16 toward the rear. A rear final assembly 37 is connected to the rear end of the rear propeller shaft 36 with a rear drive shaft 38 passing laterally through the rear final assembly 37. Hubs 42, 43 are connected to the respective ends of the rear drive shaft 38. Tubes 45, 46, 47 are provided for covering the rear propeller shaft 36 and the left and right portions of the rear drive shaft 38. A supporting member 48 is provided for supporting tubes 45, 47.

The hubs 34, 35, 42, 43 designate members for mounting the front wheels 13, 14 and the rear wheels 17, 18 shown in FIG. 1, respectively.

Figure 3:
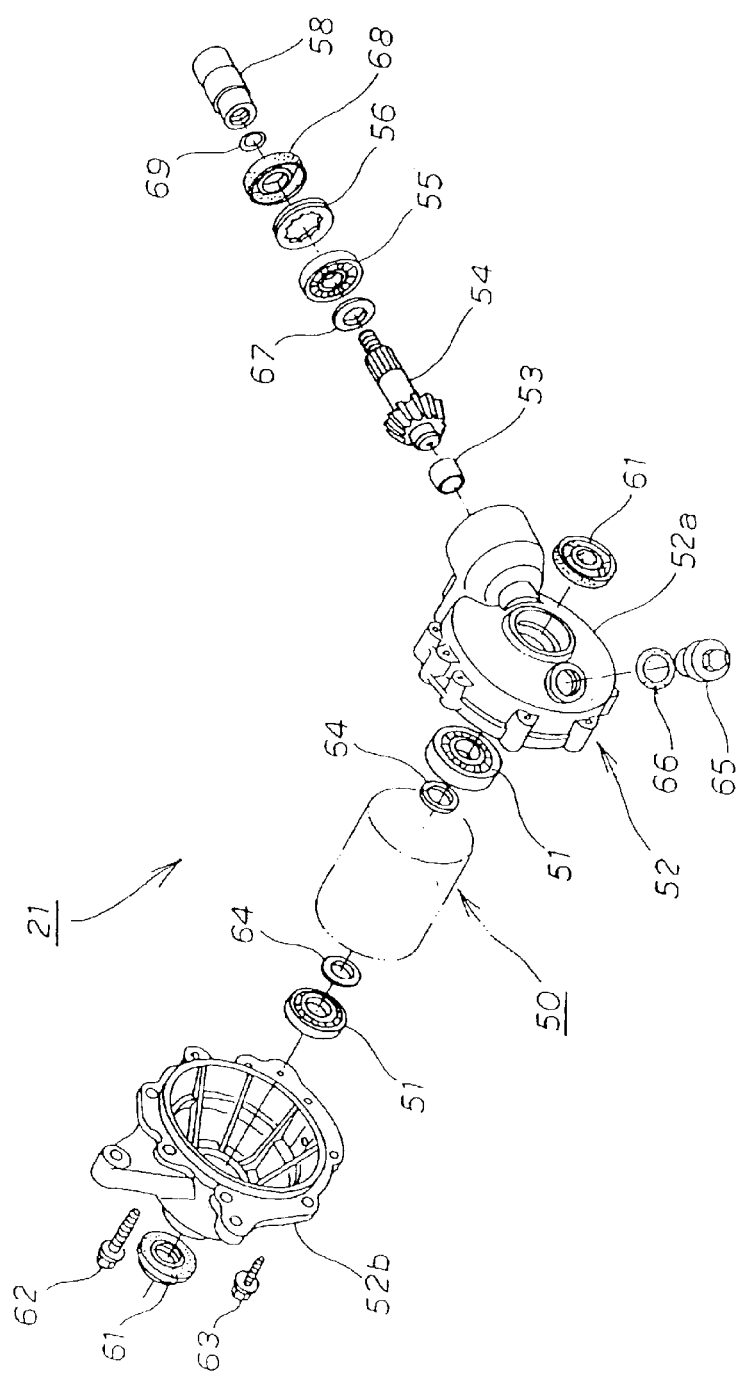
FIG. 3 is an exploded perspective view of a differential gear according to the present invention.

FIG. 3 is an exploded perspective view of the differential gear according to the present invention. The front final assembly 21 includes a differential case assembly 50 as a differential gear, a housing 52 for rotatably accommodating the differential case assembly 50 via bearings 51, 51, a drive pinion 54 to be inserted into the housing 52 from the rear via a bearing 53, a bearing 55 for rotatably mounting the drive pinion 54 to the housing 52, a lock nut 56 for preventing the bearing 55 from coming off, and a joint 58 to be mounted at the end of the drive pinion 54.

A housing body 52a is provided together with a housing cover 52b and oil seals 61, 61. Bolts 62, 63 are provided for securing the housing body 52a and the housing cover 52b with spacers 64, 64 being mounted adjacent to the case assembly 50. A maintenance hole plug 65 is provided together with an O-ring 66. A spacer 67 is provided adjacent to an oil seal 68 and an O-ring 69.

Figure 4:
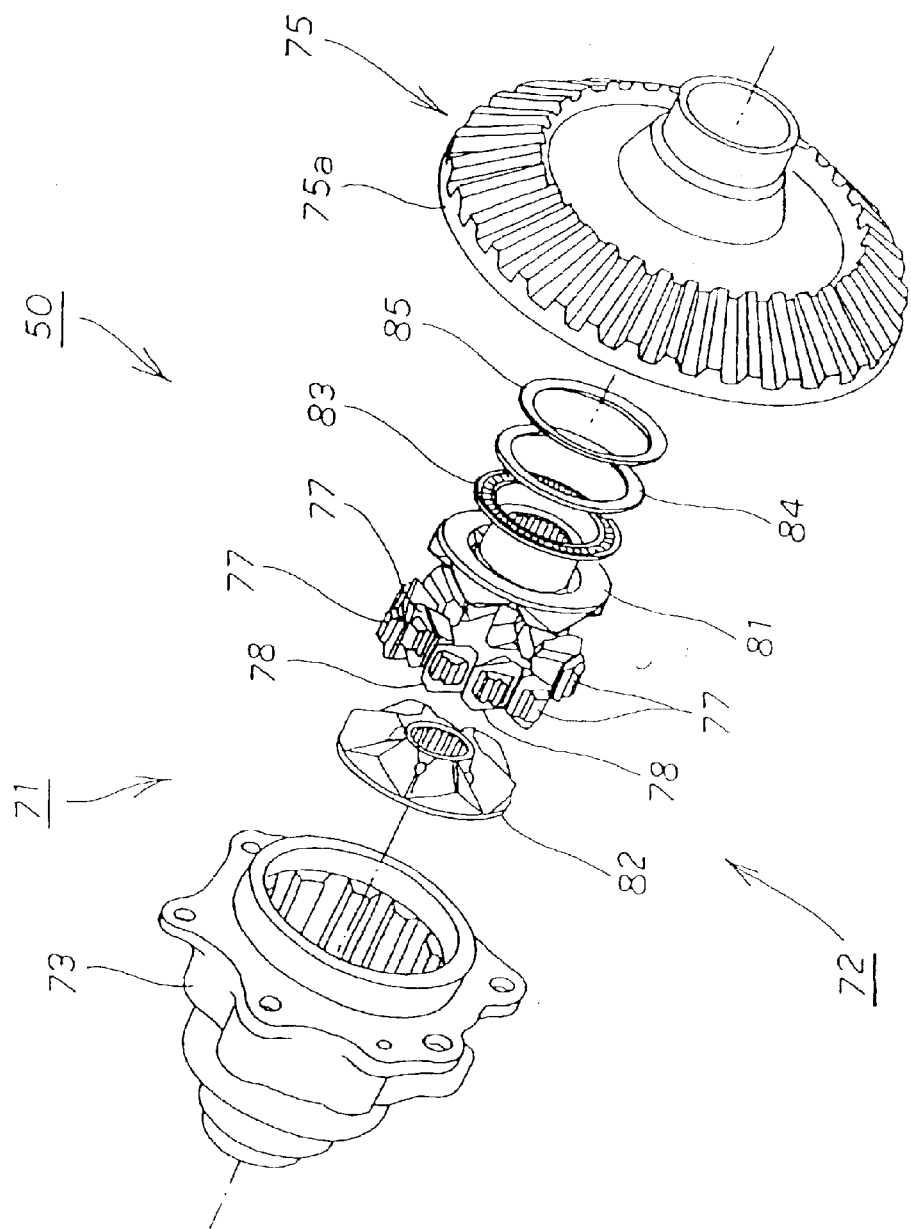
FIG. 4 is an exploded perspective view of the differential gar according to the present invention.

FIG. 4 is an exploded perspective view of the differential gear according to the present invention. The differential case assembly 50 includes a differential case 71, and components 72 to be stored in the differential case 71.

The differential case 71 includes a cap-shaped case body 73, and the cap 74 (not shown, but described later) to be mounted on the opening of the case body 73. A ring gear 75 is attached on the cap 74.

The components 72 includes two kinds of input-side blocks 77 . . . , ( . . . means that there are a plurality of these items) 78 . . . rotating integrally with the differential case 71, left and right output-side cams 81, 82 being capable of clamping the input-side blocks 77 . . . , 78 . . . so as to allow relative slippage, and being capable of rotating independently due to the frictional force generated at each block 77 . . . , 78 . . . , a thrust washer 84 in abutment with the left output-side cam 81, and a disc spring 85 in abutment with the thrust washer 84.

Figure 5:
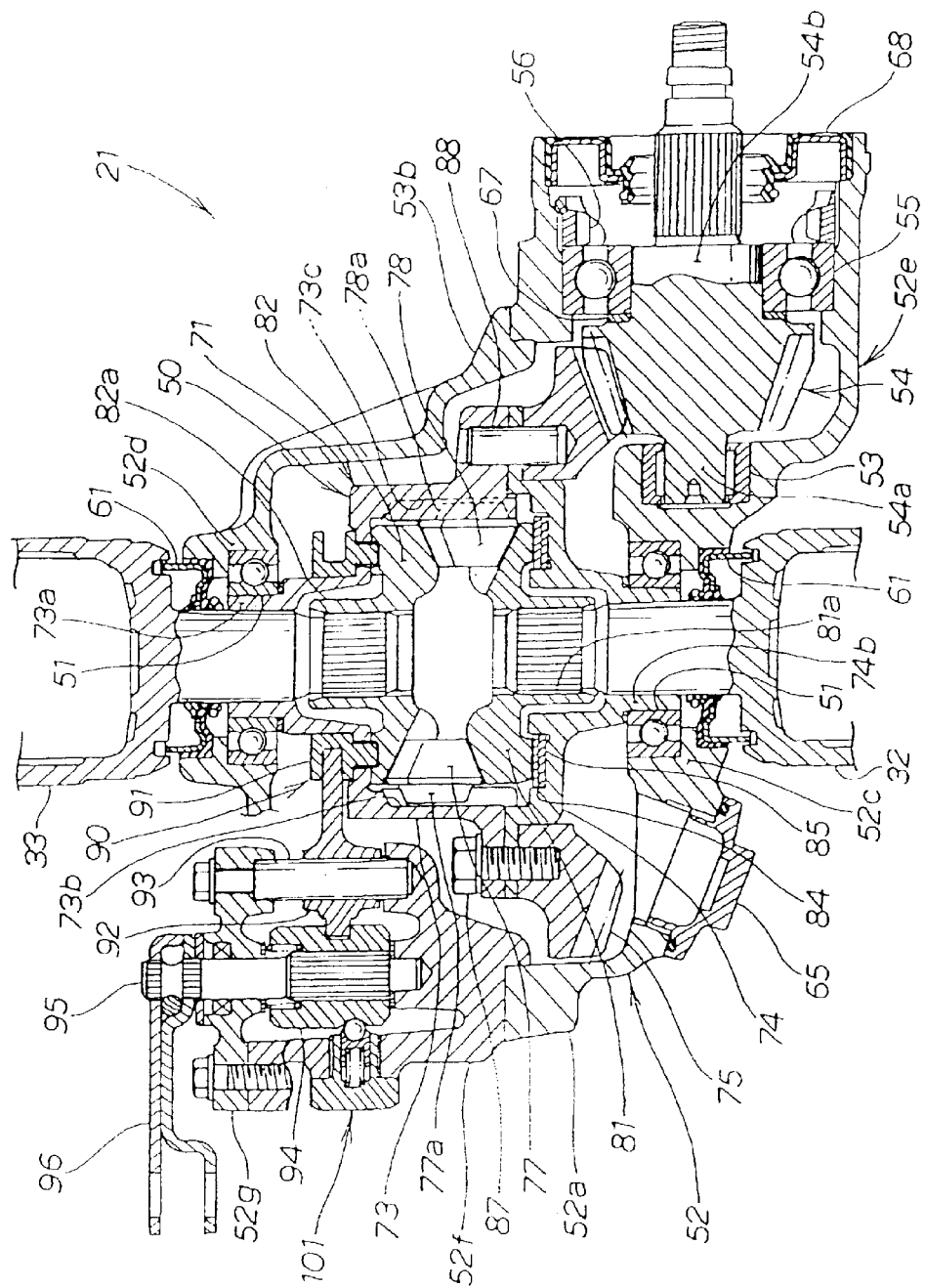
FIG. 5 is a cross-sectional view taken along the line 5—5 in FIG. 2.

FIG. 5 is a cross-sectional view taken along the line 5—5 in FIG. 2.

The front final assembly 21 is a device combined with the differential case assembly 50 by disposing the left output-side cam 81 inside the cap 74 in abutment with the ring gear 75 via the disc spring 85 and the thrust washer 84, mounting the case body 73 on the ring gear 75 via the cap 74 with bolts 87 . . . (only one bolt 87 is shown in the figure), disposing the input-side blocks 77 . . . , 78 . . . circumferentially in the case body 73 so as to come into contact with the left output-side cam 81, and disposing the right output-side cam 82 in the case body 73 so as to come into contact with the input-side blocks 77 . . . , 78 . . . . Positioning pins 88 . . . are provided for positioning the case body 73 with respect to the ring gear 75 and the cap 74.

The front final assembly 21 is a device formed by assembling the housing 52 by mounting a cylindrical portion 74b of the cap 74 to the journal 52c of the housing body 52a via the bearing 51, mounting a first cylindrical portion 73a of the case body 73 to the journal 52d of the housing cover 52b via the bearing 51, and mounting the housing cover 52b on the housing body 52a with bolts 62 . . . , 63 . . . . (See FIG. 3), and then rotatably mounting the differential case assembly 50 in the housing 52.

The front final assembly 21 is a device formed by allowing the drive pinion 54 to mesh with the ring gear 75 by inserting the front end 54a of the drive pinion 54 into the rear cylindrical portion 52e of the housing body 52a via the bearing 53 and mounting the midsection 54b of the drive pinion 54 to the rear cylindrical portion 52e via the bearing 55 and screwing a lock nut 56 in the inner periphery of the rear cylindrical portion 52e to prevent the bearing 55 from coming off.

The input-side blocks 77, 78 are members being provided with projections 77a, 78a, respectively, and fitted to rotate together with the case body 73 and also to move along the axial direction of the case body 73 by fitting the projections 77a, 78a into the axial grooves 73b . . . , 73c . . . formed on the inner surface of the case body 73.

The left and right output-side cams 81, 82 are members for transmitting a drive force to the front wheels 13, 14 (See FIG. 1) by spline-fitting the front drive shafts 32, 33 with the cylindrical portions 81a, 82a respectively.

The drive pinion 54 is a member for transmitting a drive force from the power unit 16 (See FIG. 1) to the differential case assembly 50 via a ring gear 75 by being connected to the front propeller shaft 31 (See FIG. 2) via the joint 58 (See FIG. 3).

The front final assembly 21 is a differential case assembly 50 having a limited-slip differential function combined with a differential lock mechanism 90 for suspending the differential function of the left and right front wheels 13, 14 connected to the left and right front drive shafts 32, 33, that is, for carrying out differential lock, by rigidly linking the rotation of the differential case 71 and the left and right output-side cams 81, 82 by coupling the right output-side cam 82 integrally with the differential case 71.

Figure 6:
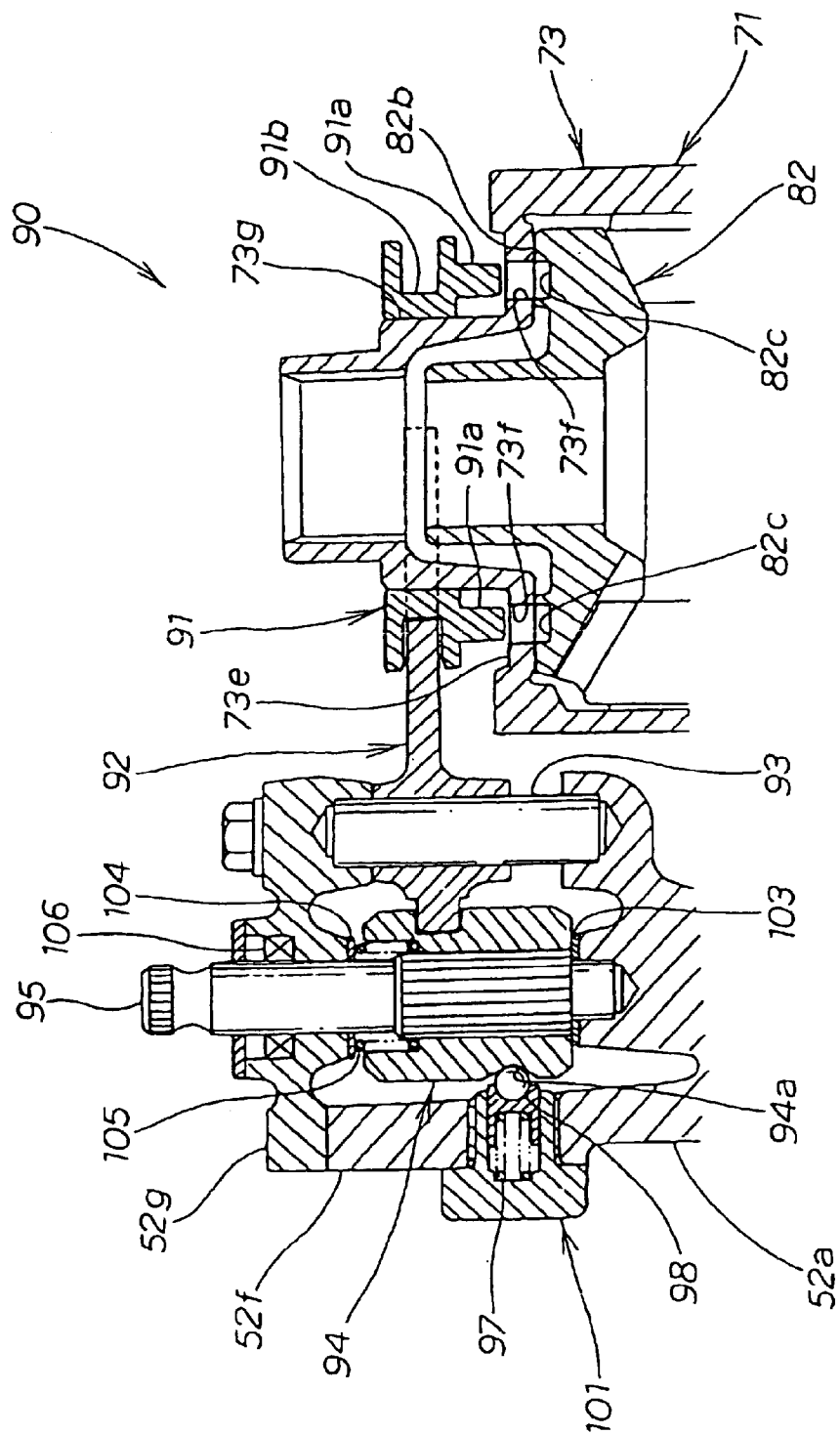
FIG. 6 is a cross-sectional view of the principal portion showing a differential lock mechanism according to the present invention.

FIG. 6 is a cross-sectional view of a principal portion showing a differential lock mechanism according to the present invention. The differential lock mechanism 90 includes recesses 82c, 82c formed on the side surface 82b of the right output-side cam 82, through holes 73f, 73f formed on the sidewall 73e of the case body 73 at a positions corresponding to the recesses 82c, 82c, an annular member 91 formed with projections 91a, 91a being capable of being inserted into and pulled out from the through holes 73f, 73f and the recesses 82c, 82c and movably mounted on a second cylindrical portion 73g of the case body 73. A fork member 92 is provided with an end that is inserted into the outer circumferential groove 91b formed on the annular member 91. A guide pin 93 is provided for guiding the movement of the fork member 92 and the cam member 94 is provided for moving the fork member 92. A shaft 95 is fitted into the cam member 94 with a lever member 96 mounted at the end of the shaft 95 (See FIG. 5) for rotating the shaft 95. A click mechanism 101 having a ball 98 to be pushed against outer peripheral recesses 94a, 94b (as regards the outer peripheral recess 94b, see FIG. 10) is formed on the outer peripheral surface of the cam member 94 by a spring 97 for stopping the rotation of the cam member 94 at predetermined positions.

FIG. 6 illustrates a state in which the differential lock mechanism 90 is not operated, and the right output-side cam 82 rotates independently of the differential case 71.

A sub-housing 52f is mounted on the housing body 52a with a sub-housing cover 52g being provided for supporting the guide pin 93 and the shaft 95 together with the sub-housing 52f. Spacers 103, 104 are provided together with a spring 105 and a dust seal 106.

FIG. 7 is a side view of the annular member and the fork member of the differential lock mechanism according to the present invention. The annular member 91 is a member provided with columnar projections 91a, 91a on the inner flat side. The annular member 91 is provided with a jam member (not shown) for preventing it from being rotated with respect to the case body 73.

The fork member 92 includes fork-shaped ends 92a fitted into the outer circumferential groove 91b of the annular member 91, a boss 92b provided on the opposite end from the fork-shaped end 92a to be fitted on the guide pin 93 (See FIG. 6), and a protrusion 92c extended radially from the boss 92b.

FIGS. 8(a) and 8(b) are side views of the cam member of the differential lock mechanism.

FIG. 8(a) illustrates the protrusion 92c in a state in which the fork member 92 is situated as shown in FIG. 6.

The cam member 94 is a member formed with a S-shaped cam groove 94c on the outer peripheral surface (cam groove 94c is positioned on the far side of the outer peripheral surface), and the protrusion 92c of the fork member 92 (See FIG. 6) is fitted in the cam groove 94c.

Therefore, when the cam member 94 rotates about the axis of rotation 111, the cam groove 94c moves, and the protrusion 92c moves in the direction in which the axis of the cam member 94 extends, in other words, in the vertical direction in FIG. 8(a), along the cam groove 94c.

The FIG. 8(b) shows a state in which the cam member 94 has rotated from the state shown in the FIG. 8(a), and thus the protrusion 92c has moved downward along the cam groove 94c. The reference sign M in the FIGS. 8(a) and 8(b) represents the amount of movement of the protrusion 92c from the state shown in FIG. 8(a) to the state illustrated in FIG. 8(b).

Figure 9:
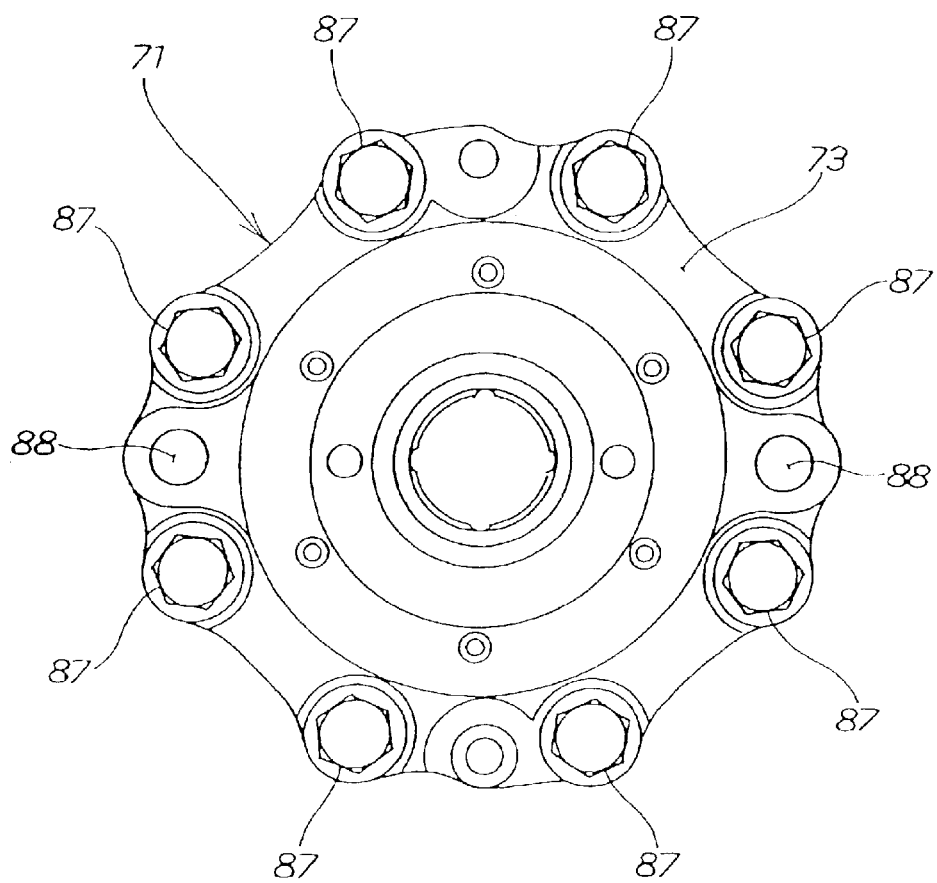
FIG. 9 is a front view of the differential case of a differential gear according to the present invention.

FIG. 9 is a front view of the differential case of the differential gear according to the present invention, showing a state in which the case body 73 of the differential case 71 and the cap 74 (See FIG. 5) are positioned by the positioning pins 88, 88, and secured by the bolts 87 . . . .

In this manner, employing the positioning pins 88, 88 enables enhanced assembling accuracy between the case body 73 and the cap 74, and when a drive force (rotational force) is transmitted from the ring gear 75 (See FIG. 5) to the case body 73 via the cap 74, the positioning pins 88, 88 receive the drive force. In addition, the bolts 87 . . . can bear the weight on the differential case 71 in the axial direction, and the positioning pin 88 and the bolt 87 can share the drive force and the weight so that the burden applied on the bolt 87 may be reduced in comparison with the case in which the bolt 87 also serves as the positioning pin 88 when the positioning pin 88 is not provided.

The operation of the differential lock mechanism 90 described thus far will be described below.

Figure 10:
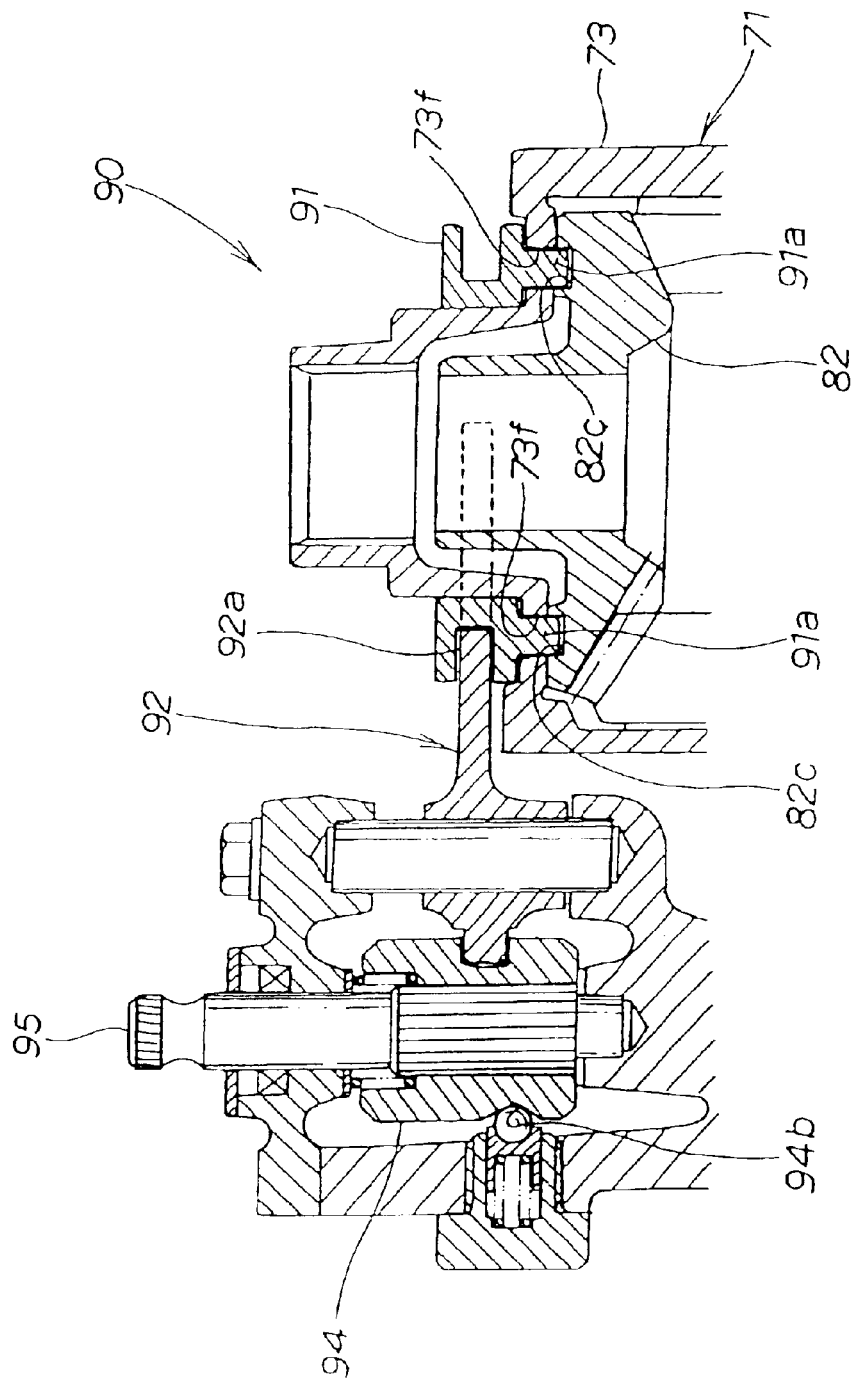
FIG. 10 is a cross-sectional view of a principal portion illustrating the operation of the differential lock mechanism of the differential gear according to the present invention.

FIG. 10 is a cross-sectional view of a principal portion illustrating the operation of the differential lock mechanism of the differential gear according to the present invention, showing a state in which the differential lock mechanism 90 is operated from the state shown in FIG. 6.

In other words, in FIG. 5, the lever member 96 is moved down to rotate the shaft 95, and to rotate the cam member 94 integrally with the shaft 95.

Accordingly, the protrusion 92c shown in FIG. 8(a) is moved by the amount of movement M to the position shown in FIG. 8(b), and in FIG. 10, the fork-shaped end 92a of the fork member 92 is moved downward in FIG. 10, and as result the annular member 91 moves downward in FIG. 10 so that the projections 91a, 91a formed on the annular member 91 are inserted into the through holes 73f, 73f of the case body 73 and the recesses 82c, 82c of the right output-side cam 82.

As a consequence, the right output-side cam 82 is rigidly linked with the case body 73 and rotates together with the case body 73.

Accordingly, in FIG. 5, the right output-side cam 82 is integrated with the input-side blocks 77 . . . , 78 . . . without relative slippage.

In a state in which the differential lock mechanism 90 does not work, when the left or right output-side cam 81, 82 rotates with respect to the input-side blocks 77 . . . , 78 . . . , the other one rotates differently in response. Therefore, as described above, when the right output-side cam 82 cannot rotate with respect to the input-side blocks 77 . . . , 78 . . . by the operation of the differential lock mechanism 90, the left output-side cam 81 does not rotate. In other words, the left output-side cam 81 and the right output-side cam 82 which rotates with the case body 73 all rotate as one unit. As a consequence, the left and right front wheels 13, 14 (See FIG. 1) rotate as one unit. The relative rotation of the left and right output-side cams 81, 82 will be described in conjunction with the next diagram.

FIGS. 11(a)–(d) are development diagrams (pattern diagrams) showing states into which the input-side block and the output-side cam of the differential gear according to the present invention shift in the circumferential direction. In FIGS. 11(a) to 11(d), movement of the left and right output-side cams 81, 82 in association with the lapse of time, and more specifically, the process in which the left output-side cam 81 moves toward the left in FIGS. 11(a) to 11(d) with respect to the right output-side cam 82 will be described.

Figure 11A:
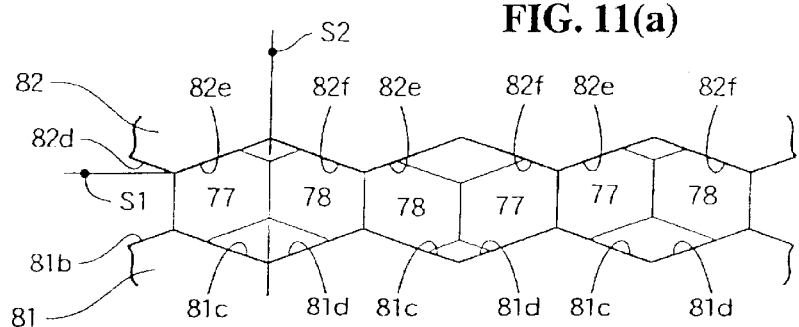
FIGS. 11(a) to 11(d) are a series of development diagrams (pattern diagrams) showing positional changes of the input-side blocks and the output-side cams of the differential gear according to the present invention when the input side blocks shift in the circumferential direction.

In the FIG. 11(a), the input-side block 77 has a hexagonal shape in its developed state, and is a mirror shape of the input-side block 78 when developed.

The left output-side cam 81 has a cam surface with projections 81b, and the cam surface 81b is a surface including the left first slopes 81c and the left second slopes 81d connected alternatively.

The right output-side cam 82 has a cam surface with projections 82d, and the cam surface 82d is a surface including the right first slope 82e and the right second slope 82f connected alternatively.

The reference signs S1 and S2 represent reference lines based on a part of the right output-side cam 82.

Figure 11B:
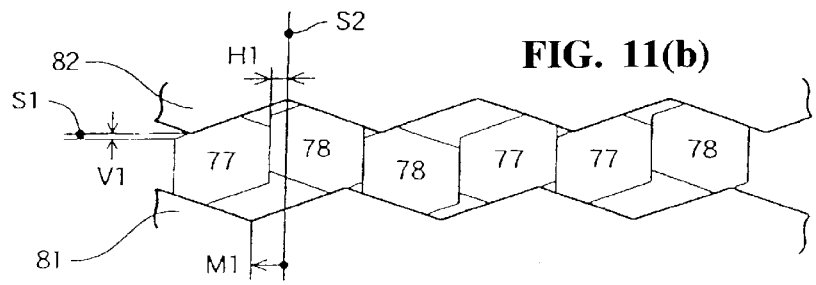

In contrast to the FIG. 11(a), FIG. 11(b) shows a state in which the input-side block 77 moves from the side of the right output-side cam 82 toward the left output-side cam 81 by a distance V1, the right output-side cam 82 moves in the opposite direction with respect to the input-side block 77 (rightward in FIG. 11(b)) by a distance H1, and the left output-side cam 81 moves leftward with respect to the right output-side cam 82 by a distance M1 when a force in the circumferential direction (leftward in FIG. 11(b)) is applied.

Figure 11C:
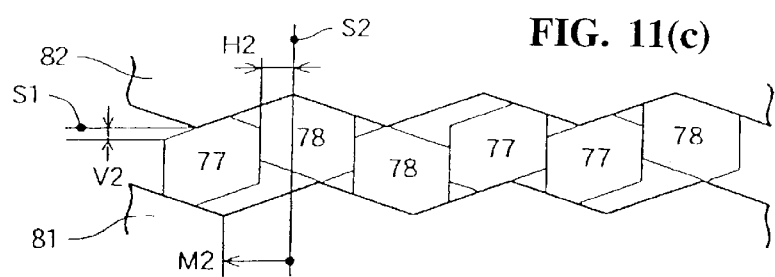

In contrast to FIG. 11(a), FIG. 11(c) shows a state in which the input-side block 77 moves from the side of the right output-side cam 82 toward the left output-side cam 81 by a distance V2, the right output-side cam 82 moves in the opposite direction from the input-side block 77 by a distance H2, and the left output-side cam 81 moves leftward with respect to the right output-side cam 82 by a distance M2 when a force in the circumferential direction (leftward in FIG. 11(c)) is applied.

Figure 11D:
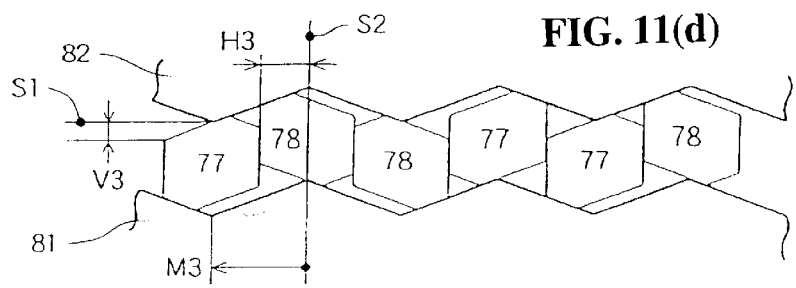
Figure 12:
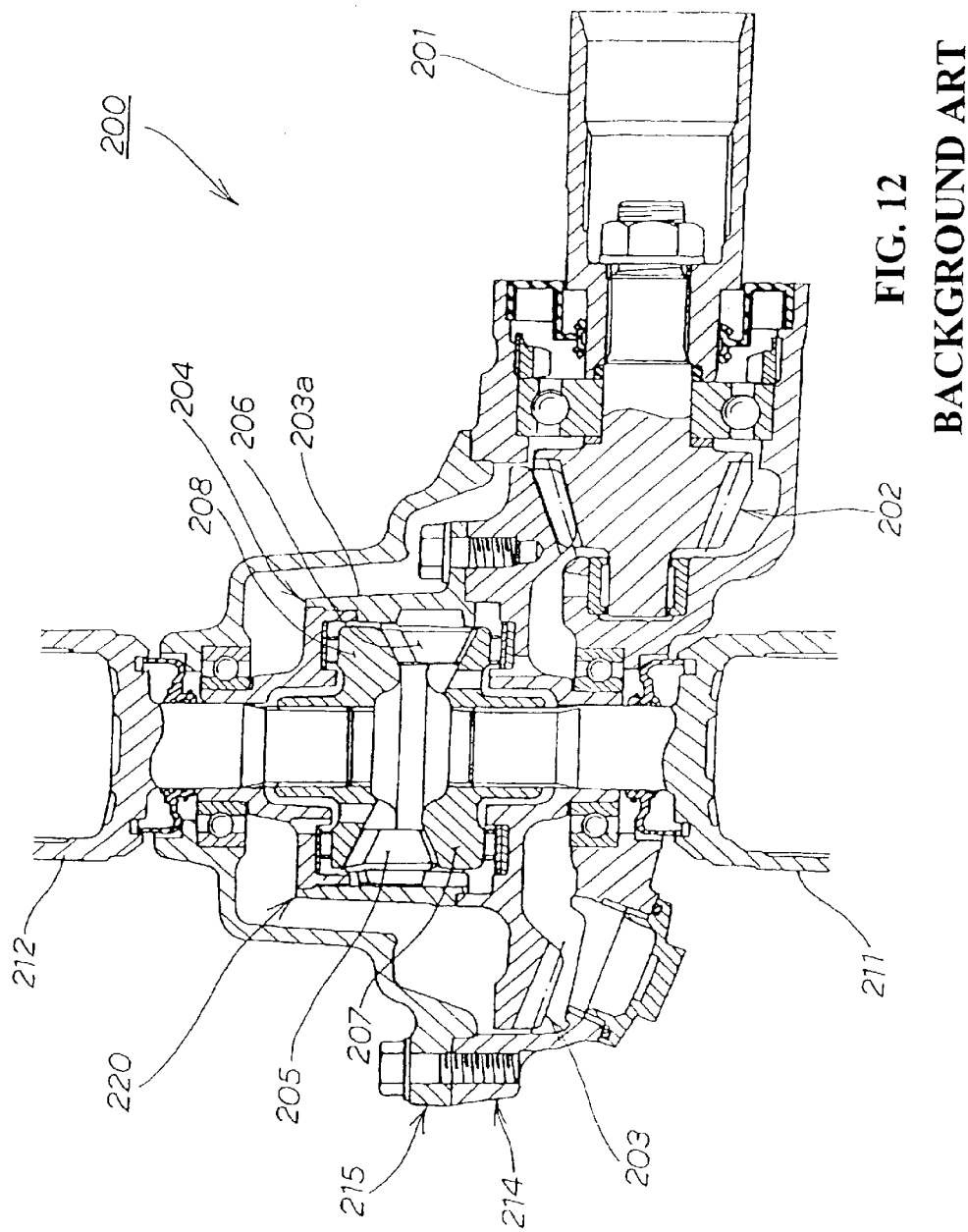
FIG. 12 is a cross-sectional view of the final reduction gear in the related art.

In contrast to FIG. 11(a), FIG. 11(d) shows a state in which the input-side block 77 moves from the side of the right output-side cam 82 toward the left output-side cam 81 by a distance V3, the right output-side cam 82 moves in the opposite direction with respect to the input-side block 77 by a distance H3, and the left output-side cam 81 moves leftward with respect to the right output-side cam 82 by a distance M3 when the input-side block 77 is applied with a force in the circumferential direction (leftward in FIG. 11(d)).

As is represented by the input-side block 77, the input-side blocks 77 . . . , 78 . . . move, or rotate, relative to the cams, while generating a frictional force with the left and right output-side cams 81, 82 respectively when there is a difference in speed of movement or revolution between the left and right output-side cams 81, 82.

When there is no difference in revolution between the left output-side cam 81 and the right output-side cam 82, the input-side blocks 77 . . . , 78 . . . , and the left and right output-side cams 81, 82 do not rotate relative to each other, but rotate uniformly.

Therefore, as shown in FIG. 10, when the differential case 71 is locked with the right output-side cam 82 by actuating the differential lock mechanism 90, the differential case 71, the input-side blocks 77 . . . , 78 . . . and the right output-side cam 82 shown in FIG. 11(a) are rigidly linked. Therefore, the respective slopes 81c, 81d of the left output-side cam 81 cannot move beyond the input-side blocks 77 . . . , 78 . . . . As a consequence the left output-side cam 81 rotates together with the input-side blocks 77 . . . , 78 . . . . In other words, the left and right output-side cams 81, 82 do not rotate with respect to each other, but rotate uniformly.

As described in conjunction with FIG. 5 and FIG. 6 above, the present invention is a differential case assembly 50 as a differential gear including a ring gear 75 being meshed with a drive pinion 54 to be connected to an engine constituting a power unit 16 (See FIG. 1), a differential case 71 mounted on the ring gear 75, a plurality of input-side blocks 77, 78 partially fitted into axial grooves 73b, 73c formed on the inner peripheral surface of the differential case 71, and two output-side cams 81, 82 being capable of clamping the blocks 77, 78 with the inner surfaces of the cams so as to allow slippage between each part and rotating independently due to the frictional force with each block 77, 78, and being connected to left and right front wheels 13, 14 respectively, wherein the side surface 82b of the right output-side cam 82 is formed with recesses 82c, 82c, the differential case 71 is formed with through holes 73f, 73f on the sidewall 73e of the case body 73 at a positions corresponding to the recesses 82c, 82c, on the case body 73 is placed an annular member 91 so as to be capable of moving, and projections 91a, 91a are provided on the annular member 91 so as to be inserted in and pulled out from the recesses 82c, 82c through the through holes 73f, 73f, in other words, the front final assembly 21, or more specifically, the differential case assembly 50 is installed with the differential lock mechanism 90.

The differential case 71 and the right output-side cam 82 may be rigidly joined and hence the differential function of the left and right front wheels 13, 14 may be suspended by inserting the projections 91c, 91c into the recesses 82c, 82c of the right output-side cam 82 thorough the through holes 73f, 73f. In addition, since it is achieved simply by forming the recesses 82c, 82c on the right output-side cam 82, forming the through holes 73f, 73f on the differential case 71, and adding the movable annular member 91 on the differential case 71, the basic construction of the differential gear in the related art is not modified greatly, simplifying the construction, and thus significant increase in costs may be avoided.

Furthermore, since the front final assembly 21 of the present invention has a Limited-Slip Differential case assembly 50 and a differential lock function of the differential lock mechanism 90, for example, it is possible to suspend the differential lock function and travel only with a Limited-Slip Differential function on rough-terrain wherein the conditions of the road surface is relatively good, and to use the differential lock function to ensure the maximum drive force on the road surface in bad conditions such as rocky, sandy, or muddy places, so as to enhance the capability of getting over barriers or of getting out of bad spots.

In the present embodiment, as shown in FIG. 7, the annular member 91 and the fork member 92 are provided separately. However, the invention is not limited to this feature, and the annular member 91 and the fork member 92 may be formed integrally.

According to the present invention thus constructed, the following effects are achieved. The differential gear is provided with a recess formed on the outer surface of the output-side cam, a through hole formed on the sidewall of the case at a position corresponding to the recess with an annular member placed on the case so as to be capable of moving. A projection is provided on this annular member that can be inserted into and pulled out of the recess through the through hole. The case and the output-side cam can be coupled rigidly and hence the differential function of the left and right drive wheels can be suspended by inserting the projection into the recess on the output-side cam through the through hole. In addition, since it is achieved simply by forming the recess on the output-side cam, forming the through hole on the case, and placing the movable annular member on the case, the basic construction of the differential gear in the related art is not modified greatly, simplifying the construction so that significant increase in costs may be avoided.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A differential gear comprising:
    a ring gear being meshed with a drive pinion to be connected to an engine, with a case mounted on the ring gear;
    a plurality of input-side blocks partially fitted into grooves formed on the inner surface of the case; and
    two output-side cams being capable of clamping the blocks so that the inner surfaces of the cams can slip relative to the blocks and rotate independently due to the friction with each block, and being connected to the left and right drive wheels respectively;
    wherein the outer surface of one of the output-side cams is formed with recesses, the case is formed with through holes on a sidewall of the case at positions corresponding to the recesses, an annular member is placed around an outer cylindrical side of the case so as to be capable of moving, and projections are formed on the annular member so as to be capable of being inserted in and pulled out from the recesses through the through holes, and
    wherein the outer surface of the one of the output-side cams is provided with an extending portion that extends backwards, and the recesses are formed in the extending portion.

2. The differential gear according to claim 1, and further including an actuating member operatively mounted on a housing for selectively imparting a reciprocating movement to said annular member for enabling said projections to be inserted into said recesses and withdrawn from said recesses.

3. The differential gear according to claim 2, wherein said actuating member is a fork member operatively mounted within a groove in said annular member.

4. The differential gear according to claim 2, and further including a guide pin mounted on the housing for guiding the reciprocal movement of said actuating member.

5. The differential gear according to claim 4, and further including a cam member operatively connected to said actuating member for selectively imparting a reciprocal movement thereto.

6. The differential gear according to claim 5, wherein said cam member includes a cam groove disposed on an outer surface thereof and said actuating member includes a protrusion extending within said cam groove for selectively imparting reciprocal movement to said actuating member.

7. The differential gear according to claim 6, wherein said cam member is manually actuated to impartment rotation thereto for selectively imparting reciprocal movement to said actuating member for engaging said projections within said recesses for locking said output-side cams relative to each other to prevent slip therebetween.

8. The differential gear according to claim 6, and further including a click mechanism operatively connected to said cam member for retaining a predetermined position therebetween.

9. The differential gear according to claim 8, wherein said click mechanism includes a ball biased in a direction for engaging a recess formed in said cam member for stopping the rotation of said cam member in a predetermined position.

10. The differential according to claim 4, wherein the guide member has an axis parallel to an axis of the annular member, and the actuating member moves reciprocally along the guide pin.

11. A differential gear comprising:
    a ring gear;
    a drive pinion being meshed with said ring gear;
    a case mounted adjacent to the ring gear;
    a plurality of input-side blocks partially fitted into grooves formed on the inner surface of the case; and
    two output-side cams being capable of clamping the blocks so that the inner surfaces of the cams can slip relative to the blocks and rotate independently due to the friction with each block, and being connected to the left and right drive wheels respectively;
    wherein the outer surface of one of the output-side cams is formed with at least one recess, the case is formed with at least one through hole on a sidewall of the case at a position corresponding to the recess, an annular member is placed around an outer surface of the case so as to be capable of moving, and at least one projection is formed on the annular member so as to be capable of being inserted in and pulled out from the at least one recess through the at least one hole; and further including:
    an actuating member operatively mounted on a housing for selectively imparting a reciprocating movement to said annular member for enabling said at least one projection to be inserted into said at least one recess and withdrawn from said at least one recess; and a guide pin mounted on said housing for guiding the reciprocal movement of said actuating member, the guide pin having an axis parallel to an axis of the annular member, and the actuating member moving reciprocally along the guide pin.

12. The differential gear according to claim 11, wherein said actuating member is a fork member operatively mounted within a groove in said member.

13. The differential gear according to claim 11, and further including a cam member operatively connected to said actuating member for selectively imparting a reciprocal movement thereto.

14. The differential gear according to claim 13, wherein said cam member includes a cam groove disposed on an outer surface thereof and said actuating member includes a protrusion extending within said cam groove for selectively imparting reciprocal movement to said actuating member.

15. The differential gear according to claim 14, wherein said cam member is manually actuated to impartment rotation thereto for selectively imparting reciprocal movement to said actuating member for engaging said at least one projection within said at least one recess for locking said output-side cams relative to each other to prevent slip therebetween.

16. The differential gear according to claim 14, and further including a click mechanism operatively connected to said cam member for retaining a predetermined position therebetween.

17. The differential gear according to claim 16, wherein said click mechanism includes a ball biased in a direction for engaging a recess formed in said cam member for stopping the rotation of said cam member in a predetermined position.

18. A differential gear comprising:

a ring gear being meshed with a drive pinion to be connected to an engine, with a case mounted on the ring gear;

a plurality of input-side blocks partially fitted into grooves formed on the inner surface of the case; and two output-side cams being capable of clamping the blocks so that the inner surfaces of the cams can slip relative to the blocks and rotate independently due to the friction with each block, and being connected to the left and right drive wheels respectively;

wherein the outer surface of one of the output-side cams is formed with recesses, the case is formed with through holes on a sidewall of the case at positions corresponding to the recesses, an annular member is placed around an outer side of the case so as to be capable of moving, and projections are formed on the annular member so as to be capable of being inserted in and pulled out from the recesses through the through holes;

and further including:

an actuating member operatively mounted on a housing for selectively imparting a reciprocating movement to said annular member for enabling said projections to be inserted into said recesses and withdrawn from said recesses;

a guide pin mounted on the housing for guiding the reciprocal movement of said actuating member;

a cam member operatively connected to said actuating member for selectively imparting a reciprocal movement thereto, wherein said cam member includes a cam groove disposed on an outer surface thereof, and said actuating member includes a protrusion extending within said cam groove for selectively imparting reciprocal movement to said actuating member.

* * * * *